United States Patent
Frison

(10) Patent No.: US 11,080,288 B2
(45) Date of Patent: Aug. 3, 2021

(54) DATA QUERYING SYSTEM AND METHOD

(71) Applicant: SAP SE, Walldorf (DE)

(72) Inventor: Giancarlo Frison, Munich (DE)

(73) Assignee: SAP SE, Walldorf (DE)

( * ) Notice: Subject to any disclaimer, the term of this patent is extended or adjusted under 35 U.S.C. 154(b) by 73 days.

(21) Appl. No.: 16/687,982

(22) Filed: Nov. 19, 2019

(65) Prior Publication Data

US 2021/0097087 A1 Apr. 1, 2021

(30) Foreign Application Priority Data

Sep. 26, 2019 (EP) .................................... 19199868

(51) Int. Cl.
*G06F 16/2457* (2019.01)
*G06F 16/248* (2019.01)
(Continued)

(52) U.S. Cl.
CPC ...... *G06F 16/24578* (2019.01); *G06F 16/243* (2019.01); *G06F 16/248* (2019.01); *G06F 16/285* (2019.01); *G06F 40/289* (2020.01)

(58) Field of Classification Search
CPC ............. G06F 16/24578; G06F 16/243; G06F 16/285; G06F 16/248; G06F 40/289
(Continued)

(56) References Cited

U.S. PATENT DOCUMENTS

| | | | |
|---|---|---|---|
| 7,779,009 B2 | 8/2010 | Chowdhury et al. | |
| 8,996,350 B1 * | 3/2015 | Dub ........................ | G06F 16/35 704/1 |

(Continued)

OTHER PUBLICATIONS

Thannaing, Myomyo et al., "Improving Information Retrieval Based on Query Classification Algorithm", Machine Learning and Applications: An International Journal (MLAIJ), vol. 1, No. 1, Sep. 2014 (Sep. 2014), XP055650406, DOI: 10.5281/zenodo.1310888, (pp. 21-31, 11 total pages), Retrieved from the Internet: URL:http://airccse.org/journal/mlaij/papers/1114mlaij03.
(Continued)

*Primary Examiner* — Dung K Chau
(74) *Attorney, Agent, or Firm* — Buckley, Maschoff & Talwalkar LLC

(57) ABSTRACT

A database querying system, comprising an input interface unit configured to receive textual input and to convert the textual input into a textual data string, a sequencing unit configured to obtain at least one key phrase from the textual data string and to obtain for each of the at least one key phrase a set of all contiguous sequences of words of the respective key phrase, a classification network unit configured to access a semantic network for each of the contiguous sequences of words, wherein the classification network unit is configured to set a classification flag for the respective contiguous sequence of words, if the semantic network contains a link between the respective contiguous sequence of words and an entry in a predetermined classification database; a comparison unit configured to access a predetermined target database for each of the contiguous sequences of words, wherein the comparison unit is configured to set a target flag for the respective contiguous sequence of words, if the predetermined target database contains at least one entry matching the respective contiguous sequence of words, and an output interface unit configured to output at least one contiguous sequence of words and information relating to whether at least one of the respective target flag and the respective classification flag has been set.

19 Claims, 4 Drawing Sheets

Figure 1:
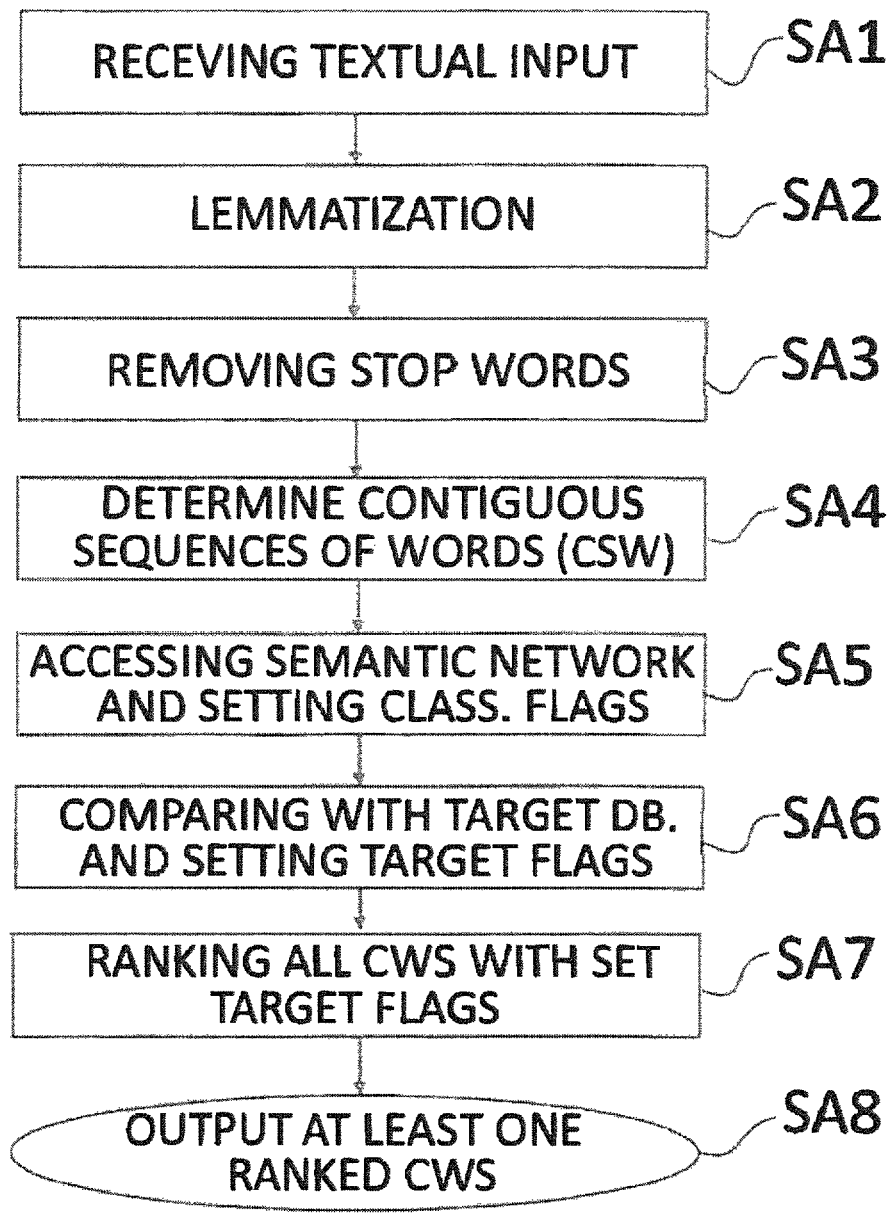

(51) Int. Cl.
*G06F 16/28* (2019.01)
*G06F 16/242* (2019.01)
*G06F 40/289* (2020.01)

(58) Field of Classification Search
USPC .......................................................... 707/730
See application file for complete search history.

(56) References Cited

U.S. PATENT DOCUMENTS

| | | | | |
|---|---|---|---|---|
| 10,027,796 | B1* | 7/2018 | Almog | G06F 16/907 |
| 10,388,272 | B1* | 8/2019 | Thomson | G10L 15/063 |
| 10,573,312 | B1* | 2/2020 | Thomson | G10L 15/30 |
| 2017/0140219 | A1* | 5/2017 | King | G06K 9/2063 |
| 2018/0359199 | A1* | 12/2018 | Nguyen | G06F 16/2365 |
| 2019/0050406 | A1* | 2/2019 | Nguyen | G06F 16/24535 |
| 2019/0295199 | A1* | 9/2019 | O'Dorisio | G06Q 50/18 |
| 2020/0175961 | A1* | 6/2020 | Thomson | G10L 15/063 |

OTHER PUBLICATIONS

Alemzadeh, Milad et al., "Exploring Wikipedia's Category Graph for Query Classification", Jun. 22, 2011 (Jun. 22, 2011), International Conference on Financial Cryptograph and Data Security, Springer, Berlin, Heidelberg, XP047436037, ISBN: 978-3-642-17318-9, (pp. 222-230, 9 total pages).

Diemert, Eustache et al., "Unsupervised Query Categorization using Automatically-Built Concept Graphs", International World Wide Web Conference 18th, ACM, Madrid, ES, Apr. 20, 2009 (Apr. 20, 2009), XP058210878, DOI: 10.1145/1526709.1526772, ISBN: 978-1-60558-487-4, (pp. 461-470, 10 total pages).

"European Search Report", European Patent Office, dated Dec. 13, 2019 (dated Dec. 13, 2019), for European Application No. 19199868.1-1217, 10pgs.

* cited by examiner

DATA QUERYING SYSTEM AND METHOD

CROSS-REFERENCE TO RELATED APPLICATIONS

The present application claims priority under 35 U.S.C. § 119(a) to EP Patent Application No. 19199868.1, filed Sep. 26, 2019, the contents of which are incorporated herein by reference for all purposes.

DESCRIPTION

The invention relates to a database querying system, a database querying method, a corresponding computer program product, and a corresponding non-transitory storage medium.

The invention lies in the field of database management, in particular in the field of database queries. Conventional database query systems, which may be included as functional components of chatbots, are designed to return information in response to queries or to accomplish specific tasks by means of natural language. The queries posed to such database query systems often stem from a wide range of different types of queries. In particular, such queries may be very detailed, such as "1 search for Voelkel Apfel", or very generic, such as "have you got fruit juice?".

In particular, such queries may contain word aggregations that hold a specific meaning only when they are considered together and in sequence. For example, in the query "give me a red bull" the word aggregation "red bull" may, when presented to a chatbot of a conversational commerce app for groceries, refer to the drink "red bull" instead of a red coloured bull. Conversely, the word aggregation "red bull" may, when presented to a chatbot of a conversational commerce app for cattle auctioning, refer to a red coloured bull instead of the drink "red bull". In particular, it may therefore occur that pertinent, as well as non-pertinent information is returned in response to a query by a conventional database query system.

It is therefore an object of the invention to provide a database query system with enhanced accuracy of returned information and improved querying efficiency.

The above object is solved by a database querying system, a database querying method, a corresponding computer program product, and a corresponding non-transitory storage medium according to the independent claims, respectively. Preferred embodiments form the subject of the dependent claims.

In particular, it is beneficial to return pertinent information in response to a specific query, even if the exact queried information is not present in a queried database. Furthermore, it was recognised within the scope of the disclosure that querying a full target database for all possible permutations of the initial search query leads to a significant consumption of available resources and time. The disclosed database querying system, database querying method, corresponding computer program product, and corresponding non-transitory storage medium address the above issues in particular by providing the most pertinent information available in response to a specific query, while also significantly reducing the overall resources required to complete the query.

One aspect of the disclosure relates to a database querying system, comprising an input interface unit configured to receive textual input and to convert the textual input into a textual data string; a sequencing unit configured to obtain at least one key phrase from the textual data string and to obtain for each of the at least one key phrase a set of all contiguous sequences of words of the respective key phrase; a classification network unit configured to access a semantic network for each of the contiguous sequences of words, wherein the classification network unit is configured to set a classification flag for the respective contiguous sequence of words, if the semantic network contains a link between the respective sequence of words and an entry in a predetermined classification database; a comparison unit configured to access a predetermined target database for each of the contiguous sequences of words, wherein the comparison unit is configured to set a target flag for the respective contiguous sequence of words, if the predetermined target database contains at least one entry matching the respective contiguous sequence of words; and an output interface unit configured to output at least one contiguous sequence of words and information relating to whether at least one of the respective target flag and the respective classification flag has been set.

The input interface unit may in particular be configured to receive any type of textual input. In particular, the input interface unit may be configured to receive input from one or more input sources, such as a user. In particular, a user may for example be a human user or a digital entity, such as a program or app. Preferentially, the input interface unit may be configured to receive the textual input for example via at least one of a keyboard and/or a microphone. However, the input interface unit may not be limited to such textual input and may receive input via a multitude of means. The input interface unit may preferentially be configured to convert the received textual input into the textual data string using any possible encoding methods, such as for example speech-to-text algorithms. The received textual input may in particular correspond to a query of the predetermined target database. The input interface unit may in particular be configured to provide the textual data string to the sequencing unit.

The sequencing unit may be in particular configured to receive the textual data string from the input interface unit. The sequencing unit may in particular be configured to obtain the at least one key phrase from the textual data string by at least removing stop words from the textual data string. The sequencing unit may be preferentially configured to analyse the received textual data string and to identify any stop words present in the textual data string. Stop words are in particular common words present in a language and may include at least one of an article, a preposition, and an adverb, such as "yesterday" and/or "at". The sequencing unit may be configured to remove any identified stop words from the textual input to obtain the at least one key phrase. In particular, a key phrase of the at least one key phrase may be a contiguous sequence of words delimited by two of: the beginning of the textual data string, the end of the textual data string, a first word removed by the sequencing unit, and a second word removed by the sequencing unit. Therefore, a key phrase may for example be the entire textual data string or a subset thereof.

The sequencing unit may in particular be configured to analyse every key phrase of the at least one key phrase and determine all possible contiguous sequences of words of the respective key phrase. A contiguous sequence of words of a key phrase is an uninterrupted sequence of words within the key phrase and may represent an n-gram of the respective key phrase. For example, for the three-word key phrase "A B C", the sequencing unit would return the set {"A B C"; "A B"; "B C"; "A"; "B"; "C"} as all possible contiguous sequences of words of the key phrase "A B C". The sequencing unit may be configured to provide the sets of all contiguous sequences of words for each of the respective key phrases to the classification network unit and/or the comparison unit.

The classification network unit may be configured to receive the sets of all contiguous sequences of words for each of the respective key phrases from the sequencing unit. In particular, the classification network unit may be configured to access the semantic network for each of the contiguous sequences of words of the received sets of all contiguous sequences of words for each of the respective key phrases. In particular, in the era of big data, raw and structured representations of human knowledge are available in higher quantities and higher rates than ever. Open databases, such as for example DBPedia, Wiktionary, WordNet, OpenCyc, may be grossly defined as generic common sense of human knowledge. They may, for example, be aggregated in ConceptNet.io, a structured ontology database. In particular, such a structured ontology database may be an example of a semantic network. In particular, in a semantic network, word sequences and words are linked throughout a dense network of relationships, such as: "is part of", "is capable of", "is a type of". In particular, word sequences and words may represent vertices (or nodes) of the semantic network, while the relationships between them may represent the links (or edges) of the semantic network.

The classification network unit may, for example, preferentially be configured to check, after accessing the semantic network for a respective received contiguous sequence of words, if the respective contiguous sequence of words matches one of the vertices (or nodes) of the accessed semantic network.

If the classification network unit determines that the respective contiguous sequence of words does not match one of the vertices (or nodes) of the accessed semantic network, the classification network unit is configured to not set the classification flag for the respective contiguous sequence of words. In particular, by performing such a check, it may be possible to discard for example unknown and/or nonsensical contiguous sequences of words.

The classification network unit is configured to set a classification flag for the respective contiguous sequence of words, if the semantic network contains a link between the respective sequence of words and an entry in a predetermined classification database.

The semantic network may be stored in one or more probabilistic data structures. In particular, the semantic network may be stored in one or more bloom filters. Furthermore, the semantic network may be divided into a first semantic sub-network and a second semantic sub-network. In particular, the first semantic sub-network may comprise all nodes of the semantic network corresponding to the entries in the predetermined classification database and all nodes directly linked to at least one of the nodes of the semantic network corresponding to the entries in the predetermined classification database, while the second semantic sub-network may comprise all other nodes of the semantic network. The first semantic sub-network may be stored in a first bloom filter and/or the second semantic sub-network may be stored in a second bloom filter, wherein the classification network unit may be configured to use at least one of the first bloom filter and the second bloom filter to check for each of the contiguous sequences of words, if the semantic network contains a link between the respective sequence of words and an entry in the predetermined classification database.

Preferentially, if the classification network unit determines that the respective contiguous sequence of words does match one of the vertices (or nodes) of the accessed semantic network, the classification network unit is configured to check, if the semantic network contains a link (or edge) between the respective vertex (or node) matching the respective continuous sequence of words and at least one classification vertex (or classification node) of the semantic network matching an entry in the predetermined classification database. In particular, a link between the respective sequence of words and an entry in the predetermined classification database may also be determined to be contained in the semantic network, if the respective vertex (or node) matching the respective sequence of words is identical to at least one classification vertex (or classification node) of the semantic network matching an entry in the predetermined classification database. In particular, all entries in the predetermined classification database may preferentially match a respective classification vertex (or classification node) of the semantic network.

Preferentially, the predetermined classification database is predetermined on the basis of the predetermined target database. In particular, each entry in the predetermined target database may be assigned to at least one target category, wherein each entry of the predetermined classification database may preferentially correspond to one target category. In particular, the predetermined classification database may contain one entry for each target category to which at least one entry in the predetermined target database is assigned.

In particular, the link (or edge) of the semantic network between the respective contiguous sequence of words and the at least one entry in the predetermined classification database may preferentially be a direct link (or edge). In particular, a direct link (or edge) may be a link (or edge) between the respective contiguous sequence of words and the at least one entry in the predetermined classification database that does not include any intermittent and/or other vertices (or nodes) of the semantic network. In particular, a direct link (or edge) may also be a link (or edge) between the respective contiguous sequence of words and the at least one entry in the predetermined classification database indicating that the respective contiguous sequence of words and the at least one entry in the predetermined classification database is at least substantially identical.

If the classification network unit determines that the semantic network does not contain a link (or edge), preferentially a direct link, between the respective vertex (or node) matching the respective continuous sequence of words and at least one classification vertex (or classification node) of the semantic network, the classification network unit is configured to not set the classification flag for the respective contiguous sequence of words. In particular, if the classification unit determines that the respective sequence of words is not part of the first semantic sub-network and/or is part of the second semantic sub-network, the classification network unit may be configured to not set the classification flag for the respective contiguous sequence of words.

If the classification network unit determines that the semantic network does contain a link (or edge), preferentially a direct link, between the respective vertex (or node) matching the respective continuous sequence of words and at least one classification vertex (or classification node) of the semantic network, the classification network unit is configured to set the classification flag for the respective contiguous sequence of words. In particular, if the classification unit determines that the respective sequence of words is part of the first semantic sub-network and/or is not part of the second semantic sub-network, the classification network unit may be configured to set the classification flag for the respective contiguous sequence of words.

In particular, the classification network unit may preferentially be configured to set the classification flag of the respective contiguous sequence of words by changing a value of at least one attribute of the respective contiguous sequence of words, such as changing a classification flag attribute of the respective contiguous sequence of words from False to True. Alternatively, the classification network unit may preferentially be configured to set the classification flag of the respective contiguous sequence of words by adding at least one further attribute to the respective contiguous sequence of words, such as a classification flag attribute. However, the disclosure is not limited hereto, and the classification network unit may preferentially be configured to set the classification flag of the respective contiguous sequence of words by any possible means or method.

The classification network unit may be preferentially configured to provide all the contiguous sequences of words or only the contiguous sequences of words, for which the classification flag has been set, to the comparison unit and/or the output interface unit. The classification network unit may be preferentially configured to provide all the contiguous sequences of words or only the contiguous sequences of words, for which the classification flag has been set, and information relating to whether a classification flag has been set for the respective contiguous sequence of words to the comparison unit and/or the output interface unit.

The comparison unit is preferably configured to receive all the contiguous sequences of words or only the contiguous sequences of words, for which the classification flag has been set, from the classification network unit and/or the sequencing unit.

The comparison unit may preferentially be configured to check for each of the contiguous sequences of words, preferably for each of the received contiguous sequences of words, if a classification flag is set for the respective contiguous sequence of words.

If the comparison unit determines that the classification flag for the respective contiguous sequence of words is not set, the comparison unit may be configured to not set the target flag for the respective contiguous sequence of words.

The comparison unit may be configured to access the predetermined target database for each of the contiguous sequences of words, preferably for each of the received contiguous sequences of words, to check, if the predetermined target database contains at least one entry matching the respective contiguous sequence of words. Preferably, the comparison unit is configured to only check, if the predetermined target database contains at least one entry matching the respective contiguous sequence of words, if the comparison unit determines that the classification flag for the respective contiguous sequence of words is set.

Preferably, if the comparison unit determines that the predetermined target database does not contain at least one entry matching the respective contiguous sequence of words, the comparison unit may be configured to not set a target flag for the respective sequence of words.

If the comparison unit determines that the predetermined target database does contain at least one entry matching the respective contiguous sequence of words, the comparison unit is configured to set a target flag for the respective sequence of words.

In particular, the comparison unit may preferentially be configured to set the target flag of the respective contiguous sequence of words by changing a value of at least one attribute of the respective contiguous sequence of words, such as changing a target flag attribute of the respective contiguous sequence of words from False to True. Alternatively, the comparison unit may preferentially be configured to set the target flag of the respective contiguous sequence of words by adding at least one further attribute to the respective contiguous sequence of words, such as a target flag attribute. However, the disclosure is not limited hereto, and the comparison unit may preferentially be configured to set the target flag of the respective contiguous sequence of words by any possible means or method.

The comparison unit may be preferentially configured to provide all the contiguous sequences of words or only the contiguous sequences of words, for which the target flag has been set, to the output interface unit. The comparison unit may be preferentially configured to provide all the contiguous sequences of words or only the contiguous sequences of words, for which the target flag has been set, and information relating to whether a target flag has been set for the respective contiguous sequence of words to the output interface unit.

The output interface unit is preferentially configured to receive all the contiguous sequences of words or only the contiguous sequences of words, for which the classification flag has been set, from the classification network unit. The output interface unit is preferentially configured to receive all the contiguous sequences of words or only the contiguous sequences of words, for which the classification flag has been set, and information relating to whether a classification flag has been set for the respective contiguous sequence of words from the classification network unit.

The output interface unit is preferentially configured to receive all the contiguous sequences of words or only the contiguous sequences of words, for which the target flag has been set, from the comparison unit. The output interface unit is preferentially configured to receive all the contiguous sequences of words or only the contiguous sequences of words, for which the target flag has been set, and information relating to whether a target flag has been set for the respective contiguous sequence of words from the comparison unit.

The output unit is configured to output at least one contiguous sequence of words and information relating to whether at least one of the respective target flag and the respective classification flag has been set. Therefore, the database query system is capable of returning pertinent information in response to the textual input, even if the exact query of the textual input cannot be found in the target database. In particular, by receiving and outputting information relating to whether the classification flag and/or the target flag has been set, it may be possible to provide a direct and enhanced information return to a user regardless of whether a specific sequence of words is contained in the semantic network and/or the predetermined target database, thereby improving both system efficiency and the human machine interaction.

Preferably, the comparison unit may be configured to only access the predetermined target database for each of the contiguous sequences of words for which the classification flag has been set, wherein the comparison unit is configured to set the target flag for the respective contiguous sequence of words for which the classification flag has been set, if the predetermined target database contains at least one entry matching the respective contiguous sequence of words for which the classification flag has been set. Thereby, the database query system performs a query of the predetermined target database only on the basis of contiguous sequences of words, which are connected to the entries of the predetermined target database via the semantic network. Therefore, the database query system significantly and intelligently reduces the number of comparison/search operations in the target database, thereby significantly reducing the necessary resources to respond to the query.

Furthermore, the output interface unit may be configured to, preferentially only, output the at least one contiguous sequences of words, for which the target flag has been set, and to preferentially output the at least one contiguous sequences of words, for which the target flag has been set to a user. In particular, the output interface unit may be configured to output the at least one contiguous sequences of words, for which the target flag has been set, as an output data signal.

Preferentially, the stop words may be contained in at least one predetermined stop word database. In particular, the sequencing unit may access the predetermined stop word database and compare at least one word, preferentially each word of the textual data string with at least one entry in the predetermined stop word database. The predetermined stop word database may be located locally or remote from the database querying system. In particular, using a predetermined stop word database allows for an enhanced and modular key phrase detection and thereby enables an enhanced accuracy of returned information and improved querying efficiency.

Preferentially, the sequencing unit may be configured to obtain the at least one key phrase from the textual data string by at least accessing the semantic network and further removing at least one word not contained in the semantic network from the textual data string. In particular, at least one word is not contained in the semantic network, if said at least one word is not a vertex or node of the semantic network. Thereby an enhanced key phrase detection is provided, which allows for an enhanced accuracy of returned information and improved querying efficiency.

Preferentially, the sequencing unit is configured to obtain the at least one key phrase from the textual data string by at least removing punctuation elements from the textual data string. The punctuation elements may comprise common types of punctuation, such as for example ".", ",", ";" and "!". The sequencing unit may be further configured to access a punctuation usage database comprising at least one specific punctuation element usage case. In particular, the sequencing unit may be configured to obtain the at least one key phrase from the textual data string by further removing punctuation elements from the textual data string according to the at least one specific punctuation usage case. In particular, by removing punctuation elements from the textual data string according to the at least one specific punctuation usage case, it may be possible for the sequencing unit to differentiate between common punctuation elements, such as a question mark at the end of a question, and punctuation elements that are desirable to maintain in the text data string, such as key phrases containing punctuation elements as for example key phrases containing "Dr.". Thereby, key phrase detection is further improved.

Preferentially, the sequencing unit is configured to obtain the at least one key phrase using natural language processing.

Preferentially, the input interface unit further comprises a lemmatization sub-unit configured to replace at least one word of the textual data string with a lemma of the respective word, preferentially prior to obtaining the at least one key phrase. In other words, the lemmatization sub-unit may be configured to perform lemmatization on at least one word of the textual data string to replace the respective at least one word of the textual data string with a lemma of the respective word prior to obtaining the at least one key phrase. In particular, a lemmatization procedure performed on an inflected word will return the lemma (also referred to as a root or base form) of said inflected word. For example, the word "run" may appear in common language use in several forms, such as "run", "ran", and "running", wherein lemmatization will return in all cases "run" as the lemma of the word. Thereby, the key phrase detection is further improved.

Preferentially, the output interface unit is configured to rank all contiguous sequences of words for which the target flag and/or the classification flag is set. In particular, the output interface unit may be configured to apply any type of ranking scheme in order to rank all contiguous sequences of words for which the target flag and/or the classification flag is set. In the following, for conciseness sake, examples will be given in relation to contiguous sequences of words for which the target flag are set, however, it is to be understood that said examples may also apply to contiguous sequences of words for which the target flag and/or the classification flag is set.

For example, the output interface unit may be configured to assign to each of the contiguous sequences of words for which the target flag is set a unique rank or may be configured to assign to at least two of the contiguous sequences of words for which the target flag is set the same rank. The assigned ranking of all of the contiguous sequences of words for which the target flag is set may be reflective of a hierarchical order of all contiguous sequences of words for which the target flag is set. The assigned ranking of all contiguous sequences of words for which the target flag is set may furthermore be reflective of additional information of each of the contiguous sequences of words for which the target flag is set, such as a level of confidence that the output contiguous sequences of words are pertinent to the received textual input.

Furthermore, the output interface unit may preferentially be configured to output only the highest ranked contiguous sequence of words for which the target flag is set.

Furthermore, the output interface unit may preferentially be configured to rank all contiguous sequences of words for which the target flag is set according to the number of words of the respective contiguous sequence of words. For example, the output interface unit may be configured to assign to each of the contiguous sequences of words for which the target flag is set the number of words of the respective contiguous sequence of words as a rank. Alternatively or additionally, the output interface unit may preferentially be configured to rank all contiguous sequences of words for which the target flag is set according to the position of the respective contiguous sequence of words in the textual data string. For example, the output interface unit may be configured to assign to each of the contiguous sequences of words for which the target flag is set a number of words positioned before or after the respective contiguous sequence of words in the textual data string as a rank. However, the disclosure is not limited to the above exemplary ranking schemes and the output interface unit may preferentially be configured to rank all contiguous sequences of words for which the target flag is set according to any possible ranking scheme.

Preferentially, the sequencing unit further comprises a selection sub-unit configured to receive from a user a selection of one or more of the at least one key phrase, wherein the sequencing unit is configured to only obtain a set of all contiguous sequences of words of the respective key phrase for each of the selected key phrases. In other words, the selection sub-unit allows a user to select one or more of the at least one key phrase obtained by the sequencing unit and to thereby instruct the sequencing unit to only obtain a set of all contiguous sequences of words for each of the selected key phrases. Thereby, it is possible to further enhance the accuracy of returned information and improve the querying efficiency by enabling a further step of filtering of the at least one key phrase.

Preferentially, the selection sub-unit may alternatively or additionally be configured to receive from a user for (preferentially each of) the at least one key phrase a selection of one or more of the contiguous sequences of words, wherein the sequencing unit, the classification network unit, the comparison unit, and the output interface unit only operate on each of the selected one or more of the contiguous sequences of words. Thereby, it is possible to further enhance the accuracy of returned information and improve the querying efficiency by enabling a further step of filtering of the at least one key phrase.

Alternatively or additionally, the selection sub-unit may be configured to receive from the user a selection of a sequence of the at least one key phrase and/or of at least one contiguous sequence of words, wherein the sequencing unit, the classification network unit, the comparison unit, and the output interface unit operate on each of the at least one key phrase and/or at least one contiguous sequence of words according to the selected sequence of the at least one key phrases and/or at least one contiguous sequence of words. For example, the selection sub-unit allows a user to choose a sequence of the at least one key phrase obtained by the sequencing unit having at least a first key phrase and a second key phrase, wherein the sequencing unit, the classification network unit, the comparison unit, and the output interface unit first operate on the first key phrase, such that:

the sequencing unit obtains for the first key phrase a set of all contiguous sequences of words of the first key phrase;

the classification network unit accesses the semantic network for each of the contiguous sequences of words of the first key phrase, wherein the classification network unit sets a classification flag for the respective contiguous sequence of words, if the semantic network contains a link between the respective sequence of words and an entry in a predetermined classification database;

the comparison unit accesses the predetermined target database for each of the contiguous sequences of words for which the classification flag is set, wherein the comparison unit sets a target flag for the respective contiguous sequence of words for which the classification flag is set, if the predetermined target database contains at least one entry matching the respective contiguous sequence of words for which the classification flag is set; and the output interface unit outputs at least one contiguous sequence of words for which the target flag is set.

Furthermore, the sequencing unit, the classification network unit, the comparison unit, and the output interface unit may subsequently repeat the above steps for the second key phrase and any further key phrases according to the selected sequence of the obtained key phrases. Thereby, the database query system may be configured to output at least one contiguous sequence of words for which the target flag is set for the first key phrase before the sequencing unit, the classification network unit, the comparison unit, and the output interface unit commence operating on the second key phrase and any further key phrases. Alternatively, each of the sequencing unit, the classification network unit, the comparison unit, and the output interface unit may subsequently repeat the above steps for each of the first key phrase, the second key phrase and any further key phrases according to the selected sequence of the obtained key phrases. Thereby, the database query system may be configured such that for example the sequencing unit may commence operating on the second key phrase immediately after completing operating on the first key phrase without having to wait for the output interface unit to output at least one contiguous sequence of words for which the target flag is set for the first key phrase.

Preferentially, the database querying system further comprises a display unit configured to display the at least one contiguous sequence of words output by the output interface unit. In particular, the display unit is not restricted to any specific type of display unit, and may, for example, comprise one or more display screens.

Preferentially, the output interface unit may be further configured to output, if at least one of the at least one key phrases does not exactly match at least one of the output contiguous sequences of words, an indication that the exact respective key phrase could not be found. The indication may be displayed by the display unit.

Preferentially, the output interface unit may be further configured to output, if for none of the contiguous sequences of words the classification flag and/or the target flag is set, a corresponding error. The corresponding error may be displayed by the display unit. In other words, the output interface unit may be further configured to output, if the semantic network does not contain a link between any of the contiguous sequences of words and at least one entry in the predetermined classification database, a corresponding classification error. Alternatively or additionally, the output interface unit may be further configured to output, if the predetermined target database does not contain at least one entry matching at least one of the contiguous sequences of words, a corresponding target error.

Preferentially, the database querying system may comprise any combination of features described herein, such as described below and/or as described for the appended Figures and their description.

One aspect of the disclosure relates to a database querying method, comprising the steps:

a) receiving, by an input interface unit, textual input and converting the textual input into a textual data string;

b) obtaining, by a sequencing unit, at least one key phrase from the textual data string;

c) obtaining, by the sequencing unit, for each of the at least one key phrase a set of all contiguous sequences of words of the respective key phrase;

d) accessing, by a classification network unit, a semantic network for each of the contiguous sequences of words, and setting a classification flag for the respective contiguous sequence of words, if the semantic network contains a link between the respective contiguous sequence of words and an entry in a predetermined classification database;

e) accessing, by a comparison unit, a predetermined target database for each of the contiguous sequences of words, and setting a target flag for the respective contiguous sequence of words, if the predetermined target database contains at least one entry matching the respective contiguous sequence of words;

f) outputting, by an output interface unit, at least one contiguous sequence of words and information relating to whether at least one of the respective target flag and the respective classification flag has been set.

Preferentially, step e) comprises only accessing the predetermined target database for each of the contiguous sequences of words for which the classification flag has been set. Furthermore, step e) may comprise setting the target flag for the respective contiguous sequence of words for which the classification flag has been set, if the predetermined target database contains at least one entry matching the respective contiguous sequence of words for which the classification flag has been set. Preferentially, step f) may comprise outputting only at least one contiguous sequence of words for which the target flag is set.

Preferentially, step b) comprises obtaining at least one key phrase from the textual data string by at least removing stop words from the textual data string, wherein the stop words may preferentially be contained in a predetermined stop word database.

Preferentially, step b) at least comprises accessing the semantic network and removing at least one word not contained in the semantic network from the textual data string.

Preferentially, step b) at least comprises removing punctuation elements from the textual data string.

Preferentially, the database querying method further comprises replacing, by a lemmatization sub-unit, at least one word of the textual data string with a lemma of the respective word prior to obtaining the at least one key phrase.

Preferentially, the database querying method further comprises ranking, by the output interface unit, all contiguous sequences of words for which the target flag is set. In particular, the outputting at least one contiguous sequence of words for which the target flag is set may comprise outputting only the highest ranked contiguous sequence of words for which the target flag is set. Alternatively or additionally, the ranking at least one contiguous sequence of words for which the target flag is set may comprise ranking all contiguous sequences of words for which the target flag is set according to the number of words of the respective contiguous sequence of words. Alternatively or additionally, the ranking at least one contiguous sequence of words for which the target flag is set may comprise ranking all contiguous sequences of words for which the target flag is set according to the position of the respective contiguous sequence of words in the textual data string.

Preferentially, the database querying method further comprises receiving, by a selection sub-unit, from a user a selection of one or more of the at least one key phrase, wherein step c) comprises only obtaining a set of all contiguous sequences of words of the respective key phrase for each of the selected key phrases.

Alternatively or additionally, the database querying method further comprises receiving, by a selection sub-unit, from a user a selection of a sequence of the at least one key phrase, wherein the method comprises performing the steps c) to f) for each of the at least one key phrase according to the selected sequence of the at least one key phrase.

Preferentially, the database querying method may comprise any combination of features described herein, such as for example as described for the database querying system above and the appended Figures and their description.

One aspect of the disclosure relates to a computer program product comprising computer-readable instructions, which, when the program is executed by a computer, cause the computer to carry out a computer-implemented method according to the database querying method described above. Preferentially, the computer program product comprises computer-readable instructions, which, when the program is executed by the computer, cause the computer to carry out a computer-implemented method according to at least the following steps:

a) receiving, by an input interface unit, textual input and converting the textual input into a textual data string;
b) obtaining, by a sequencing unit, least one key phrase from the textual data string;
c) obtaining, by the sequencing unit, for each of the at least one key phrase a set of all contiguous sequences of words of the respective key phrase;
d) accessing, by a classification network unit, a semantic network for each of the contiguous sequences of words, and setting a classification flag for the respective contiguous sequence of words, if the semantic network contains a link between the respective contiguous sequence of words and an entry in a predetermined classification database;
e) accessing, by a comparison unit, a predetermined target database for each of the contiguous sequences of words, and setting a target flag for the respective contiguous sequence of words, if the predetermined target database contains at least one entry matching the respective contiguous sequence of words; and
f) outputting, by an output interface unit, at least one contiguous sequence of words and information relating to whether at least one of the respective target flag and the respective classification flag has been set.

Preferentially, the computer program product may comprise any combination of features described herein, such as for example as described for the database querying system and the database querying method above and the appended Figures and their description.

One aspect of the disclosure relates to a non-transitory storage medium containing computer-readable instructions that, when executed by a computer, cause the computer to carry out a computer-implemented method according to the database querying method described above. Preferentially, the non-transitory storage medium contains computer-readable instructions, that, when executed by the computer, cause the computer to carry out a computer-implemented method according to at least the following steps:

a) receiving, by an input interface unit, textual input and converting the textual input into a textual data string;
b) obtaining, by a sequencing unit, least one key phrase from the textual data string;
c) obtaining, by the sequencing unit, for each of the at least one key phrase a set of all contiguous sequences of words of the respective key phrase;
d) accessing, by a classification network unit, a semantic network for each of the contiguous sequences of words, and setting a classification flag for the respective contiguous sequence of words, if the semantic network contains a link between the respective contiguous sequence of words and an entry in a predetermined classification database;
e) accessing, by a comparison unit, a predetermined target database for each of the contiguous sequences of words, and setting a target flag for the respective contiguous sequence of words, if the predetermined target database contains at least one entry matching the respective contiguous sequence of words; and
f) outputting, by an output interface unit, at least one contiguous sequence of words and information relating to whether at least one of the respective target flag and the respective classification flag has been set.

Preferentially, the non-transitory storage medium may comprise any combination of features described herein, such as for example as described for the database querying system and the database querying method above and the appended Figures and their description.

Figure 2:
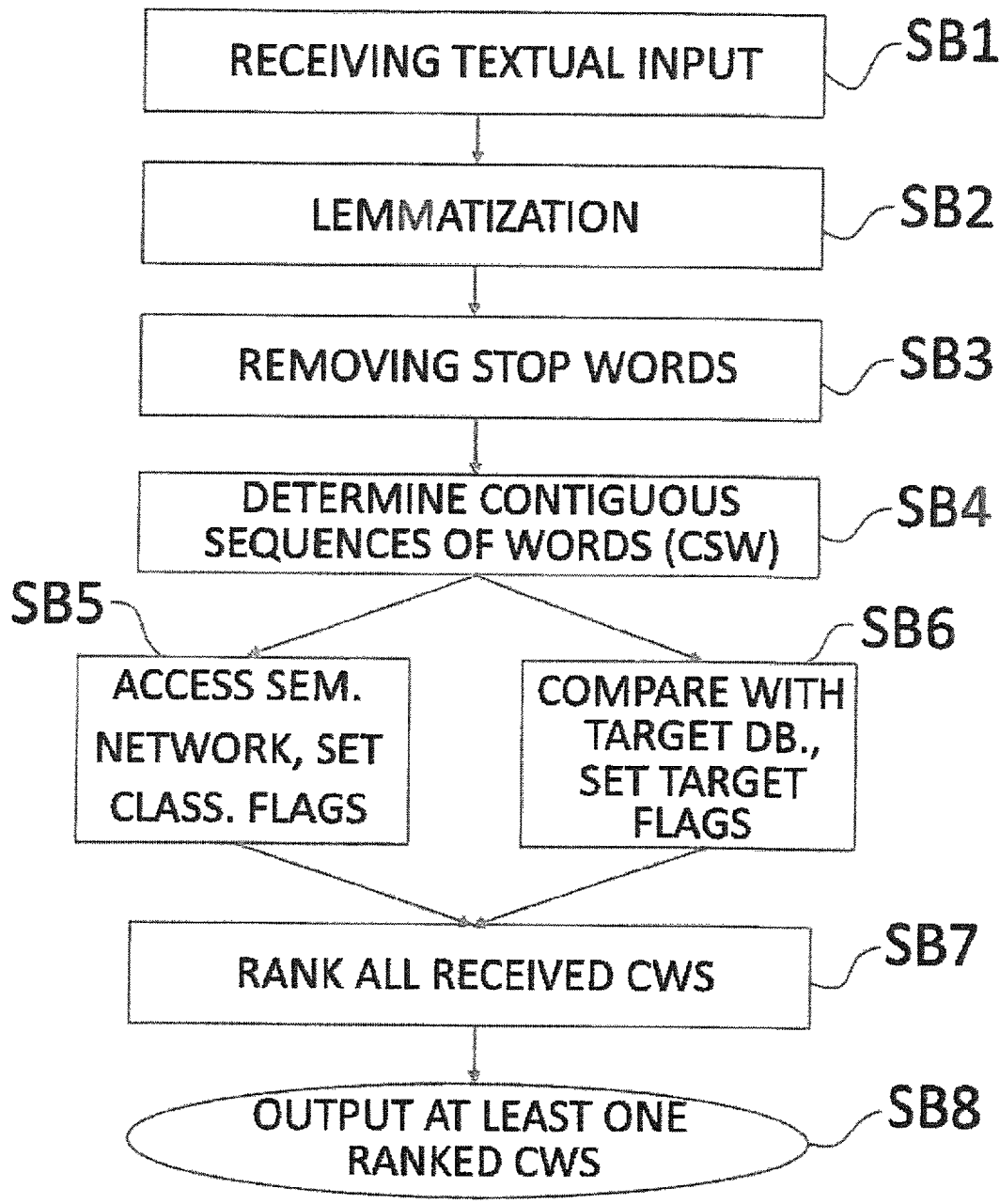
Figure 3:
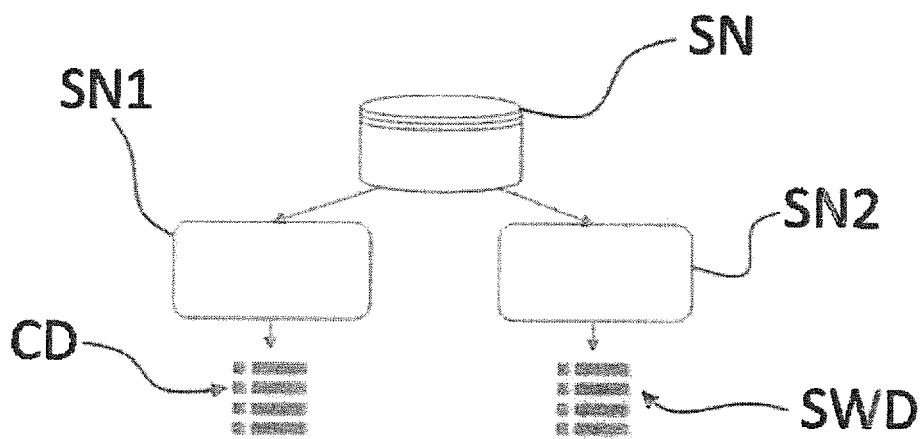
Figure 4:
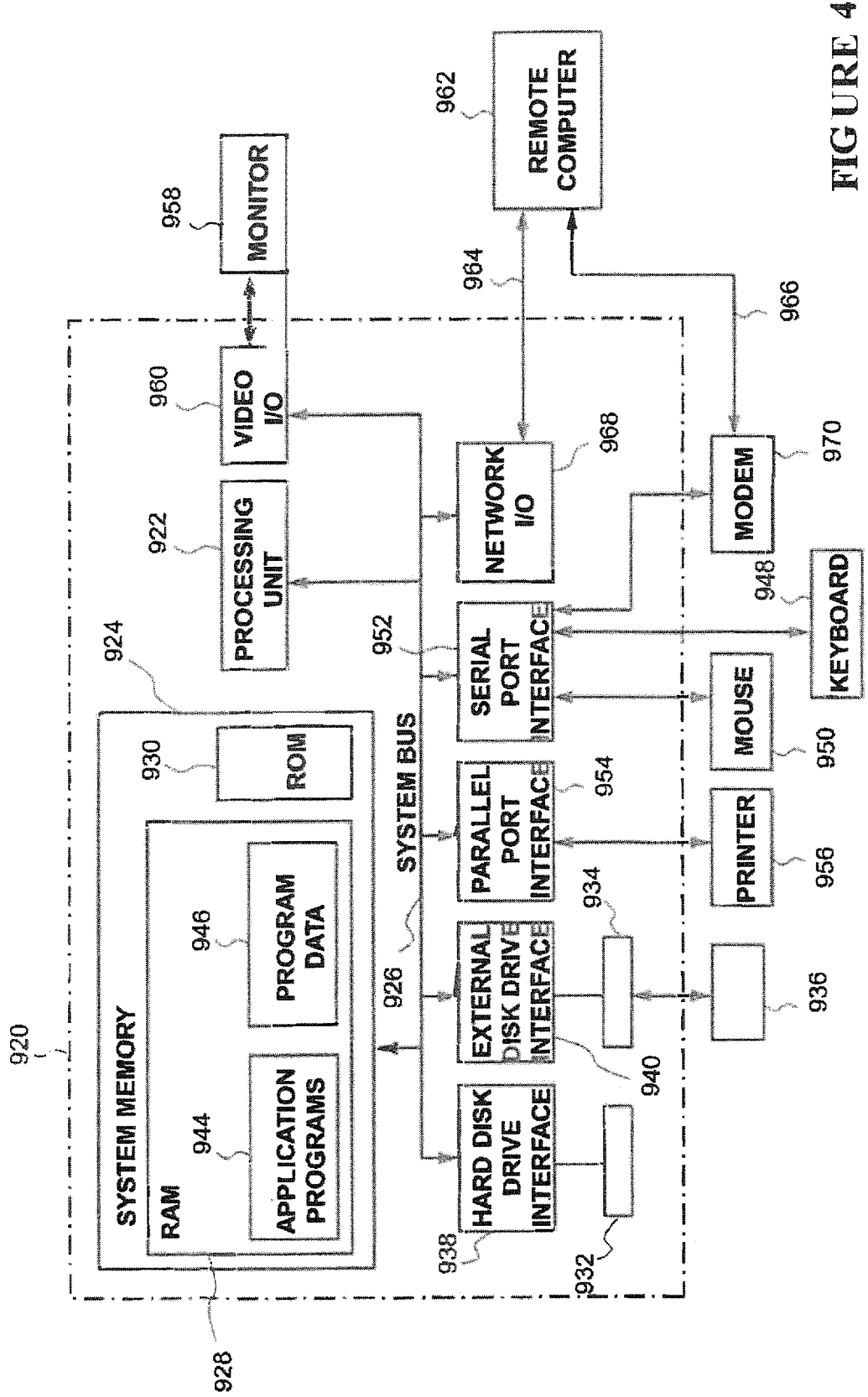

The disclosure will now be further explained with reference to exemplary embodiments, as shown in the appended Figures. In particular, the following Figures show:

FIG. 1: a flow diagram of an exemplary database querying method for an exemplary database querying system;

FIG. 2: a flow diagram of a further exemplary database querying method for an exemplary database querying system; and FIG. 3: a schematic diagram of an exemplary semantic network FIG. 4: an exemplary system.

FIG. 1 shows a flow diagram of an exemplary database querying method for an exemplary database querying system. Furthermore, the execution of the exemplary database querying method will be explained using the exemplary textual input "Could you suggest me vanilla ice cream for my party?"

In a first exemplary step SA1, the textual input "Could you suggest me vanilla ice cream for my party?" is received by an input interface unit. In particular, the textual input may for example be received from a user using a keyboard or data connection, or may be received via a microphone as a spoken input. The input interface unit is in particular configured to convert the textual input into a textual data string. In the present example, the input interface unit converts the received textual input in the textual data string:

"Could you suggest me vanilla ice cream for my party?"

In a second exemplary step SA2, the input interface unit provides the textual data string to a lemmatization sub-unit of the input interface unit. The lemmatization sub-unit is in particular configured to perform lemmatization on each word of the textual data string and to replace each word with its respective lemma. For the present exemplary textual data string, this results in the following amended textual data string:

"Can you suggest me vanilla ice cream for my party?"

In a third exemplary step SA3, the sequencing unit removes stop words from the textual data string, preferentially the amended textual data string. In particular, the sequencing unit may access a predetermined stop word database and compare each word of the textual data string with the entries of the predetermined stop word database. If an entry of the predetermined stop word database matches a word of the textual data string, the respective word is removed from the textual data string. For the present exemplary textual data string, a matching entry in the predetermined stop word database is found for each of the words "can", "you", "suggest", "me", "for", and "my". The sequencing unit therefore removes the corresponding words from the textual data string:

"~~Can you suggest me~~ vanilla ice cream ~~for my~~ party?"

Preferentially, the sequencing unit is configured to further remove punctuation elements from the textual data string. In the particular exemplary textual data string, the sequencing unit may identify "?" as a punctuation element. Furthermore, the sequencing unit may access a punctuation usage database comprising at least one specific punctuation element usage case. In the particular exemplary textual data string, the sequencing unit accesses an exemplary punctuation usage database, which contains the specific punctuation element usage case of using "?" at the end of the textual data string. Preferentially, each specific punctuation element usage case may be flagged to either remove the respective punctuation element in the respective specific punctuation element usage case or flagged to maintain the respective punctuation element in the respective specific punctuation element usage case. In the particular exemplary punctuation usage database, the specific punctuation element usage case of using "?" at the end of the textual data string is flagged to remove the respective punctuation element in the respective specific punctuation element usage case. The sequencing unit therefore removes the "?" from the textual data string:

"~~Can you suggest me~~ vanilla ice cream ~~for my~~ party~~?~~"

In particular, a key phrase of the at least one key phrase may be a contiguous sequence of words delimited by two of: the beginning of the textual data string, the end of the textual data string, a first word removed by the sequencing unit, a second word removed by the sequencing unit, a first punctuation element removed by the sequencing unit, and a second punctuation element removed by the sequencing unit. Therefore, the sequencing unit identifies in the present exemplary textual data string the two key phrases:

"vanilla ice cream" and "party"

The sequencing unit may then further operate on the obtained key phrases, "vanilla ice cream" and "party" in this case. However, the sequencing unit may also identify the entire textual data string as a key phrase, and further operate thereon as a whole.

In a fourth exemplary step SA4, the obtained key phrases are further operated on by the sequencing unit. The sequencing unit is configured to analyse both of the obtained key phrases and to determine all possible contiguous sequences of words of each of the respective key phrases. In particular, a contiguous sequence of words of a key phrase is an uninterrupted sequence of words within the key phrase and may represent an n-gram of the respective key phrase. N-grams of a key phrase may for example be obtained by the following exemplary algorithm:

```
import static java.util.stream.IntStream.range;
import static java.util.stream.IntStream.rangeClosed;
private List<String> possibleNgrams(String[ ] words) {
    return rangeClosed (1, words.length)
        .mapToObj(
            window ->
                rangeClosed(0, words.length - window)
                    .mapToObj(
                        i ->
                            range (i, i + window)
                                .mapToObj(x -> words [ x ] )
                                .collect (Collectors.joining( " " ) ) ) )
        .flatMap(Function.identity( ) )
        .collect(Collectors.toList( ) );
}
```

For the present exemplary key phrases, the sequencing unit obtains the following contiguous sequences of words for each of the key phrases:

["vanilla ice cream"; "vanilla ice"; "ice cream"; "vanilla"; "ice"; "cream"]

and

["party"]

The exemplary sequencing unit is configured to provide these sets of all contiguous sequences of words for each of the respective key phrases to a classification network unit.

In a fifth exemplary step SA5, the classification network unit receives the contiguous sequences of words for each of the respective key phrases. In particular, the classification network unit is configured to access the semantic network for each of the contiguous sequences of words for each of the respective key phrases. In the present illustrated example, the semantic network may be ConceptNet.io, a structured ontology database.

The classification network unit is configured to set a classification flag for the respective contiguous sequence of words, if the semantic network contains a link between the respective sequence of words and an entry in a predetermined classification database.

The present exemplary classification network unit is configured to check, if the semantic network contains a link (or edge) between a vertex (or node) matching a respective continuous sequence of words and at least one classification vertex (or classification node) of the semantic network matching an entry in the predetermined classification database.

The predetermined classification database is predetermined on the basis of the predetermined target database. For ease of understanding, in the illustrated example, the predetermined target database may comprise a plurality of entries assigned to only one target category, "food", wherein the predetermined classification database therefore comprises only one corresponding entry, "food".

For the example shown, the classification network unit determines that the semantic network contains a link (or edge) between each of the vertices "vanilla ice cream", "vanilla ice", "ice cream", "vanilla", "ice", and "cream" and the one classification vertex "food" of the semantic network. The classification network unit therefore sets the classification flag for the respective contiguous sequence of words "vanilla ice cream", "vanilla ice", "ice cream", "vanilla", "ice", and "cream".

The example shown, the classification network unit determines that the semantic network does not contain a link (or edge) between the vertex "party" and the one classification vertex "food" of the semantic network. The classification network unit therefore does not set the classification flag for the contiguous sequence of words "party".

The classification network unit may be preferentially configured to provide only the contiguous sequences of words, for which the classification flag has been set, to the comparison unit:
["vanilla ice cream"; "vanilla ice"; "ice cream"; "vanilla"; "ice"; "cream"]

In a sixth exemplary step SA6, the comparison unit is configured to receive the contiguous sequences of words, for which the classification flag has been set from the classification network unit.

The exemplary comparison unit is configured to access the predetermined target database for each of the contiguous sequences of words received from the classification network unit, to check, if the predetermined target database contains at least one entry matching the respective contiguous sequence of words.

In the illustrated example, the comparison unit determines that the predetermined target database does not contain at least one entry matching the respective contiguous sequence of words "vanilla ice cream" and "vanilla ice", wherein the comparison unit is configured to not set a target flag for the respective sequence of words "vanilla ice cream" and "vanilla ice".

In the illustrated example, the comparison unit determines that the predetermined target database does contain at least one entry matching the respective contiguous sequence of words "ice cream", "vanilla", "ice", and "cream", wherein the comparison unit is configured to set a target flag for the respective sequence of words "ice cream", "vanilla", "ice", and "cream".

The comparison unit may be preferentially configured to provide only the contiguous sequences of words, for which the target flag has been set, to the output interface unit:
["ice cream"; "vanilla"; "ice"; "cream"]

In a seventh exemplary step SA7, the output interface unit is preferentially configured to receive only the contiguous sequences of words, for which the target flag has been set, from the comparison unit.

In particular, the exemplary output interface unit is configured to rank all contiguous sequences of words for which the target flag is set. The exemplary output interface unit may be configured to assign to each of the contiguous sequences of words for which the target flag is set a unique rank or may be configured to assign to at least two of the contiguous sequences of words for which the target flag is set the same rank. Furthermore, the exemplary output interface unit is configured to rank all contiguous sequences of words for which the target flag is set according to the number of words of the respective contiguous sequence of words. Therefore, the exemplary output interface unit assigns the following ranks to the contiguous sequences of words, for which the target flag has been set:
"ice cream"->2
"vanilla"->1
"ice"->1
"cream"->1

Furthermore, the exemplary output interface unit is configured to output only the highest ranked contiguous sequence of words for which the target flag is set. In particular, the exemplary output interface unit is configured to output the at least one contiguous sequences of words, for which the target flag has been set, as an output data signal.

Therefore, the exemplary output interface unit outputs the following contiguous sequence of words as an output data signal:
["ice cream"]

The exemplary output interface unit is configured to output, if one of the at least one key phrases does not exactly match at least one of the output contiguous sequences of words for which the target flag is set, an indication that the exact respective key phrase could not be found. In the illustrated example, the key phrase "vanilla ice cream" does not match the output contiguous sequence of words "ice cream". Therefore, the exemplary output interface unit further outputs an indication that the exact respective key phrase "vanilla ice cream" could not be found.

In an eighth exemplary step SA8, a display unit is configured to receive both the output data signal and the indication from the exemplary output interface unit. In particular, the display unit is configured to display both the output data signal and the indication from the exemplary output interface unit to a user.

FIG. 2 shows a flow diagram of a further exemplary database querying method for an exemplary database querying system. Furthermore, the execution of the exemplary database querying method will be explained using the exemplary textual input "Could you suggest me vanilla ice cream for my party?"

In a first exemplary step SB1, the textual input "Could you suggest me vanilla ice cream for my party?" is received by an input interface unit. In particular, step SB1 may be substantially identical to step SA1. In the present example, the input interface unit converts the received textual input in the textual data string:

"Could you suggest me vanilla ice cream for my party?"

In a second exemplary step SB2, the input interface unit provides the textual data string to a lemmatization sub-unit of the input interface unit. In particular, step SB2 may be substantially identical to step SA2. For the present exemplary textual data string, this results in the following amended textual data string:

"Can you suggest me vanilla ice cream for my party?"

In a third exemplary step SB3, the sequencing unit removes stop words from the textual data string, preferentially the amended textual data string. In particular, step SB3 may be substantially identical to step SA3. Therefore, the sequencing unit identifies in the present exemplary textual data string the two key phrases:

"vanilla ice cream" and "party"

The sequencing unit may then further operate on the obtained key phrases, "vanilla ice cream" and "party" in this case. However, the sequencing unit may also identify the entire textual data string as a key phrase, and further operate thereon as a whole.

In a fourth exemplary step SB4, the obtained key phrases are further operated on by the sequencing unit. In particular, step SB4 may be substantially identical to step SA4. For the present exemplary key phrases, the sequencing unit obtains the following contiguous sequences of words for each of the key phrases:

["vanilla ice cream"; "vanilla ice"; "ice cream"; "vanilla"; "ice"; "cream"]

and

["party"]

The exemplary sequencing unit is configured to provide these sets of all contiguous sequences of words for each of the respective key phrases to a classification network unit and to a comparison unit.

In a fifth exemplary step SB5, the classification network unit receives the contiguous sequences of words for each of the respective key phrases. In particular, step SB5 may be substantially identical to step SA5, but differs in the illustrated example in the following points.

In the example shown, the classification network unit sets the classification flag for the respective contiguous sequence of words "vanilla ice cream", "vanilla ice", "ice cream", "vanilla", "ice", and "cream". Furthermore, in the example shown, the classification network unit does not set the classification flag for the contiguous sequence of words "party".

The classification network unit may be preferentially configured to provide the contiguous sequences of words and information relating to whether the respective classification flag has been set to the output interface unit. An exemplary output of the classification network unit may take the form:

[classification flag set: {"vanilla ice cream"; "vanilla ice"; "ice cream"; "vanilla"; "ice"; "cream"}]

and

[classification flag not set: {"party"}]

In a sixth exemplary step SB6, the comparison unit is configured to receive the contiguous sequences of words from the sequencing unit. In particular, step SB6 may be substantially identical to step SA6, but differs in the illustrated example in the following points.

The exemplary comparison unit is configured to access the predetermined target database for each of the contiguous sequences of words received from the sequencing unit, to check, if the predetermined target database contains at least one entry matching the respective contiguous sequence of words.

In the illustrated example, the comparison unit determines that the predetermined target database does not contain at least one entry matching the respective contiguous sequence of words "vanilla ice cream", "vanilla ice", and "party", wherein the comparison unit is configured to not set a target flag for the respective sequence of words "vanilla ice cream", "vanilla ice", and "party".

In the illustrated example, the comparison unit determines that the predetermined target database does contain at least one entry matching the respective contiguous sequence of words "ice cream", "vanilla", "ice", and "cream", wherein the comparison unit is configured to set a target flag for the respective sequence of words "ice cream", "vanilla", "ice", and "cream".

The exemplary comparison unit may be preferentially configured to provide the contiguous sequences of words and information relating to whether the respective target flag has been set to the output interface unit. An exemplary output of the comparison unit may take the form:

[target flag set: {"ice cream"; "vanilla"; "ice"; "cream"}]

and

[target flag not set: {"vanilla ice cream"; "vanilla ice"; "party"}]

In particular, exemplary steps SB5 and SB6 may be performed substantially in parallel.

In a seventh exemplary step SB7, the output interface unit is preferentially configured to receive the contiguous sequences of words and information relating to whether the respective target flag and the respective classification flag has been set from the comparison unit and the classification network unit, respectively. In particular, step SB7 may be substantially identical to step SA7, but differs in the illustrated example in the following points.

In particular, the exemplary output interface unit is configured to rank all received contiguous sequences of words. Any possible ranking scheme or algorithm may be used. For example, the output interface unit may rank all received contiguous sequences of words according to the number of respectively set flags and/or according to the number of words of the respective contiguous sequence of words.

Furthermore, the exemplary output interface unit is configured to output only the highest ranked contiguous sequence of words, for which the target flag is set, and information relating to whether the respective target flag and the respective classification flag has been set.

Therefore, the exemplary output interface unit may output for example the following information as an output data signal:

[Sequence of words: "ice cream";
  Classification flag set: Yes;
    Target flag set: Yes]

In an eighth exemplary step SB8, a display unit is configured to receive the output data signal from the exemplary output interface unit. In particular, step SB8 may be substantially identical to step SA8. In particular, the display unit is configured to display the output data signal from the exemplary output interface unit to a user.

FIG. 3 shows a schematic diagram of an exemplary semantic network SN. In particular, the exemplary semantic network SN may be ConceptNet.io, a structured ontology database. In particular, in such a semantic network SN, word sequences and words are linked throughout a dense network of relationships, such as: "is part of", "is capable of", "is a type of". In particular, word sequences and words may represent vertices (or nodes) of the semantic network SN, while the relationships between them may represent the links (or edges) of the semantic network.

The semantic network SN may in particular comprise a first semantic sub-network SN1 comprising a plurality of flaggable vertices (or nodes) and may further comprise thereto connected links (or edges), and a second semantic sub-network SN2 comprising a plurality of non-flaggable vertices (or nodes) and may further comprise thereto connected links (or edges).

In particular, the plurality of flaggable vertices (or nodes) comprise all nodes corresponding to the entries of the predetermined classification database CD, and may further comprise all nodes linked to the nodes corresponding to the entries of the predetermined classification database CD via a direct link. In particular, the classification network unit may be configured to check if a respective contiguous sequence of words is a node of the first semantic sub-network SN1, wherein the classification network unit may be configured to set a classification flag for the respective contiguous sequence of words, if the respective contiguous sequence of words is determined to be a node of the first semantic sub-network SN1.

In particular, the plurality of non-flaggable vertices (or nodes) comprise all nodes of the semantic network SN not comprised by the first semantic sub-network SN1. In particular, the classification network unit may be configured to check if a respective contiguous sequence of words is a node of the first semantic sub-network SN1, wherein the classification network unit may be configured to not set a classification flag for the respective contiguous sequence of words, if the respective contiguous sequence of words is determined not to be a node of the first semantic sub-network SN1. Alternatively or additionally, the classification network unit may be configured to check if a respective contiguous sequence of words is a node of the second semantic sub-network SN2, wherein the classification network unit may be configured to not set a classification flag for the respective contiguous sequence of words, if the respective contiguous sequence of words is determined to be a node of the second semantic sub-network SN2.

Furthermore, at least one of the nodes of the second semantic sub-network SN2 may correspond to at least one corresponding entry in the predetermined stop word database SWD.

The above exemplary embodiments and illustrated examples are not to be interpreted as limiting the scope of the present disclosure. In particular, a database querying system, a database querying method, a computer program product, and a non-transitory storage medium may comprise any combination of features contained herein and the appended Figures.

FIG. 4 shows an exemplary system for implementing the claimed subject matter including a general purpose computing device in the form of a conventional computing environment 920 (e.g. a personal computer). The conventional computing environment includes a processing unit 922, a system memory 924, and a system bus 926. The system bus couples various system components including the system memory 924 to the processing unit 922. The processing unit 922 may perform arithmetic, logic and/or control operations by accessing the system memory 924. The system memory 924 may store information and/or instructions for use in combination with the processing unit 922. The system memory 924 may include volatile and non-volatile memory, such as a random access memory (RAM) 928 and a read only memory (ROM) 930. A basic input/output system (BIOS) containing the basic routines that helps to transfer information between elements within the personal computer 920, such as during start-up, may be stored in the ROM 930.

The system bus 926 may be any of several types of bus structures including a memory bus or memory controller, a peripheral bus, and a local bus using any of a variety of bus architectures.

The personal computer 920 may further include a hard disk drive 932 for reading from and writing to a hard disk (not shown), and an external disk drive 934 for reading from or writing to a removable disk 936. The removable disk may be a magnetic disk for a magnetic disk driver or an optical disk such as a CD-ROM for an optical disk drive. The hard disk drive 932 and the external disk drive 934 are connected to the system bus 926 by a hard disk drive interface 938 and an external disk drive interface 940, respectively. The drives and their associated computer-readable media provide non-volatile storage of computer readable instructions, data structures, program modules and other data for the personal computer 920. The data structures may include relevant data for the implementation of the method as described above. The relevant data may be organized in a database, for example a relational or object database.

Although the exemplary environment described herein employs a hard disk (not shown) and an external disk 936, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 936, ROM 930 or RAM 928, including an operating system (not shown), one or more application programs 944, other program modules (not shown), and program data 946. The application programs may include at least a part of the functionality as depicted in FIGS. 1 to 3.

A user may enter commands and information, as discussed below, into the personal computer 920 through input devices such as keyboard 948 and mouse 950. Other input devices (not shown) may include a microphone (or other sensors), joystick, game pad, scanner, or the like. These and other input devices may be connected to the processing unit 922 through a serial port interface 952 that is coupled to the system bus 926, or may be collected by other interfaces, such as a parallel port interface 954, game port or a universal serial bus (USB). Further, information may be printed using printer 956. The printer 956, and other parallel input/output devices may be connected to the processing unit 922 through parallel port interface 954. A monitor 958 or other type of display device is also connected to the system bus 926 via an interface, such as a video input/output 960. In addition to the monitor, computing environment 920 may include other peripheral output devices (not shown), such as speakers or other audible output.

The computing environment 920 may communicate with other electronic devices such as a computer, telephone (wired or wireless), personal digital assistant, television, or the like. To communicate, the computer environment 920 may operate in a networked environment using connections to one or more electronic devices. FIG. 4 depicts the computer environment networked with remote computer 962. The remote computer 962 may be another computing environment such as a server, a router, a network PC, a peer device or other common network node, and may include many or all of the elements described above relative to the computing environment 920. The logical connections depicted in FIG. 4 include a local area network (LAN) 964 and a wide area network (WAN) 966. Such networking environments are commonplace in offices, enterprise-wide computer networks, intranets and the Internet and may particularly be encrypted.

When used in a LAN networking environment, the computing environment 920 may be connected to the LAN 964 through a network I/O 968. In a networked environment, program modules depicted relative to the computing environment 920, or portions thereof, may be stored in a remote memory storage device resident on or accessible to remote computer 962. It will be appreciated that the network connections shown are exemplary and other means of establishing a communications link between the electronic devices may be used.

The above-described computing system is only one example of the type of computing system that may be used to implement the method.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network.

Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A database querying system, comprising:
   an input interface unit configured to receive textual input and to convert the textual input into a textual data string;
   a sequencing unit configured to obtain at least one key phrase from the textual data string and to obtain for each of the at least one key phrase a set of all contiguous sequences of words of the respective key phrase;
   a classification network unit configured to access a semantic network (SN) for each of the contiguous sequences of words, wherein the classification network unit is configured to set a classification flag for the respective contiguous sequence of words, if the semantic network (SN) contains a link between the respective contiguous sequence of words and an entry in a predetermined classification database (CD);
   a comparison unit configured to access a predetermined target database for each of the contiguous sequences of words, wherein the comparison unit is configured to set a target flag for the respective contiguous sequence of words, if the predetermined target database contains at least one entry matching the respective contiguous sequence of words;
   an output interface unit configured to output at least one contiguous sequence of words and information relating to whether at least one of the respective target flag and the respective classification flag has been set.

2. The database querying system of claim 1, wherein the comparison unit is configured to only access the predetermined target database for each of the contiguous sequences of words for which the classification flag has been set, wherein the comparison unit is configured to set the target flag for the respective contiguous sequence of words for which the classification flag has been set, if the predetermined target database contains at least one entry matching the respective contiguous sequence of words for which the classification flag has been set, and, optionally, wherein the output interface unit is configured to only output at least one contiguous sequence of words for which the target flag is set.

3. The database querying system of claim 1, wherein the sequencing unit to obtain at least one key phrase from the textual data string by at least removing stop words from the textual data string, wherein, optionally, the stop words are contained in a predetermined stop word database (SWD); and/or
   wherein the sequencing unit is configured to obtain the at least one key phrase from the textual data string by accessing the semantic network (SN) and further removing at least one word not contained in the semantic network (SN) from the textual data string; and/or
   wherein the sequencing unit is configured to obtain the at least one key phrase from the textual data string by removing punctuation elements from the textual data string.

4. The database querying system of claim 1, wherein the input interface unit further comprises:
   a lemmatization sub-unit configured to replace at least one word of the textual data string with a lemma of the respective word.

5. The database querying system of claim 1, wherein the output interface unit is configured to rank all contiguous sequences of words for which the target flag is set, and, optionally,
   wherein the output interface unit is configured to output only the highest ranked contiguous sequence of words for which the target flag is set; and/or
   wherein the output interface unit is configured to rank all contiguous sequences of words for which the target flag is set according to at least one of:
      the number of words of the respective contiguous sequence of words; and
      the position of the respective contiguous sequence of words in the textual data string.

6. The database querying system of claim 1, wherein the sequencing unit further comprises a selection sub-unit configured to receive from a user:
   a selection of one or more of the at least one key phrase, wherein the sequencing unit is configured to only obtain a set of all contiguous sequences of words of the respective key phrase for each of the selected key phrases; and/or
   a selection of a sequence of the at least one key phrase, wherein the sequencing unit, the classification network unit, the comparison unit, and the output interface unit operate on each of the at least one key phrase according to the selected sequence of the at least two key phrases.

7. The database querying system of claim 1, wherein the input interface unit is configured to receive the textual input by at least one of a keyboard and a microphone; and/or
   wherein the database querying system further comprises a display unit configured to display the at least one contiguous sequence of words output by the output interface unit.

8. A database querying method, comprising the steps:
   a) receiving, by an input interface unit, textual input and converting the textual input into a textual data string;
   b) obtaining, by a sequencing unit, at least one key phrase from the textual data string;
   c) obtaining, by the sequencing unit, for each of the at least one key phrase a set of all contiguous sequences of words of the respective key phrase;
   d) accessing, by a classification network unit, a semantic network (SN) for each of the contiguous sequences of words, and setting a classification flag for the respective contiguous sequence of words, if the semantic network (SN) contains a link between the respective contiguous sequence of words and an entry in a predetermined classification database (CD);
   e) accessing, by a comparison unit, a predetermined target database for each of the contiguous sequences of words, and setting a target flag for the respective contiguous sequence of words, if the predetermined target database contains at least one entry matching the respective contiguous sequence of words;
   f) outputting, by an output interface unit, at least one contiguous sequence of words and information relating to whether at least one of the respective target flag and the respective classification flag has been set.

9. The database querying method of claim 8, wherein step e) comprises only accessing the predetermined target database for each of the contiguous sequences of words for which the classification flag has been set,
   wherein step e) comprises setting the target flag for the respective contiguous sequence of words for which the classification flag has been set, if the predetermined target database contains at least one entry matching the respective contiguous sequence of words for which the classification flag has been set, and, optionally,
   wherein step f) comprises outputting only at least one contiguous sequence of words for which the target flag is set.

10. The database querying method according to claim 9, wherein step b) comprises at least removing stop words from the textual data string, wherein, optionally, the stop words are contained in a predetermined stop word database (SWD); and/or
    wherein step b) comprises accessing the semantic network (SN) and further removing at least one word not contained in the semantic network (SN) from the textual data string; and/or
    wherein step b) comprises removing punctuation elements from the textual data string.

11. The database querying method according to claim 10, wherein the method further comprises:
    replacing, by a lemmatization sub-unit, at least one word of the textual data string with a lemma of the respective word prior to obtaining the at least one key phrase.

12. The database querying method according to claim 11, wherein the method further comprises ranking, by the output interface unit, all contiguous sequences of words for which the target flag is set, and, optionally:
    wherein the outputting at least one contiguous sequence of words for which the target flag is set comprises outputting only the highest ranked contiguous sequence of words for which the target flag is set; and/or
    wherein the ranking at least one contiguous sequence of words for which the target flag is set comprises ranking all contiguous sequences of words for which the target flag is set according to at least one of:
       the number of words of the respective contiguous sequence of words; and
       the position of the respective contiguous sequence of words in the textual data string.

13. The database querying method according to claim 12, wherein the method further comprises receiving, by a selection sub-unit, from a user:
    a selection of one or more of the at least one key phrase, wherein step c) comprises only obtaining a set of all contiguous sequences of words of the respective key phrase for each of the selected key phrases; and/or a selection of a sequence of the at least one key phrase, wherein the method comprises performing the steps c) to f) for each of the at least one key phrase according to the selected sequence of the at least one key phrase.

14. A non-transitory storage medium containing computer-readable instructions that, when executed by a computer, cause the computer to:
   a) receive, by an input interface unit, textual input and converting the textual input into a textual data string;
   b) obtain, by a sequencing unit, at least one key phrase from the textual data string;
   c) obtain, by the sequencing unit, for each of the at least one key phrase a set of all contiguous sequences of words of the respective key phrase;
   d) access, by a classification network unit, a semantic network (SN) for each of the contiguous sequences of words, and setting a classification flag for the respective contiguous sequence of words, if the semantic network (SN) contains a link between the respective contiguous sequence of words and an entry in a predetermined classification database (CD);
   e) access, by a comparison unit, a predetermined target database for each of the contiguous sequences of words, and setting a target flag for the respective contiguous sequence of words, if the predetermined target database contains at least one entry matching the respective contiguous sequence of words;
   f) output, by an output interface unit, at least one contiguous sequence of words and information relating to whether at least one of the respective target flag and the respective classification flag has been set.

15. The non-transitory storage medium of claim 14, wherein step e) comprises only accessing the predetermined target database for each of the contiguous sequences of words for which the classification flag has been set,
   wherein step e) comprises setting the target flag for the respective contiguous sequence of words for which the classification flag has been set, if the predetermined target database contains at least one entry matching the respective contiguous sequence of words for which the classification flag has been set, and, optionally,
   wherein step f) comprises outputting only at least one contiguous sequence of words for which the target flag is set.

16. The non-transitory storage medium of claim 15, wherein step b) comprises at least removing stop words from the textual data string, wherein, optionally, the stop words are contained in a predetermined stop word database (SWD); and/or
   wherein step b) comprises accessing the semantic network (SN) and further removing at least one word not contained in the semantic network (SN) from the textual data string; and/or
   wherein step b) comprises removing punctuation elements from the textual data string.

17. The non-transitory storage medium of claim 16, the computer-readable instructions further to, when executed by a computer, cause the computer to:
   replace, by a lemmatization sub-unit, at least one word of the textual data string with a lemma of the respective word prior to obtaining the at least one key phrase.

18. The non-transitory storage medium of claim 17, the computer-readable instructions further to, when executed by a computer, cause the computer to:
   rank, by the output interface unit, all contiguous sequences of words for which the target flag is set, and
   wherein the outputting at least one contiguous sequence of words for which the target flag is set comprises outputting only the highest ranked contiguous sequence of words for which the target flag is set; or
   wherein the ranking at least one contiguous sequence of words for which the target flag is set comprises ranking all contiguous sequences of words for which the target flag is set according to at least one of:
      the number of words of the respective contiguous sequence of words; and
      the position of the respective contiguous sequence of words in the textual data string.

19. The non-transitory storage medium of claim 18, the computer-readable instructions further to, when executed by a computer, cause the computer to:
   receive, by a selection sub-unit, from a user:
   a selection of one or more of the at least one key phrase, wherein step c) comprises only obtaining a set of all contiguous sequences of words of the respective key phrase for each of the selected key phrases; and/or
   a selection of a sequence of the at least one key phrase, wherein the method comprises performing the steps c) to f) for each of the at least one key phrase according to the selected sequence of the at least one key phrase.

* * * * *